UNITED STATES PATENT OFFICE.

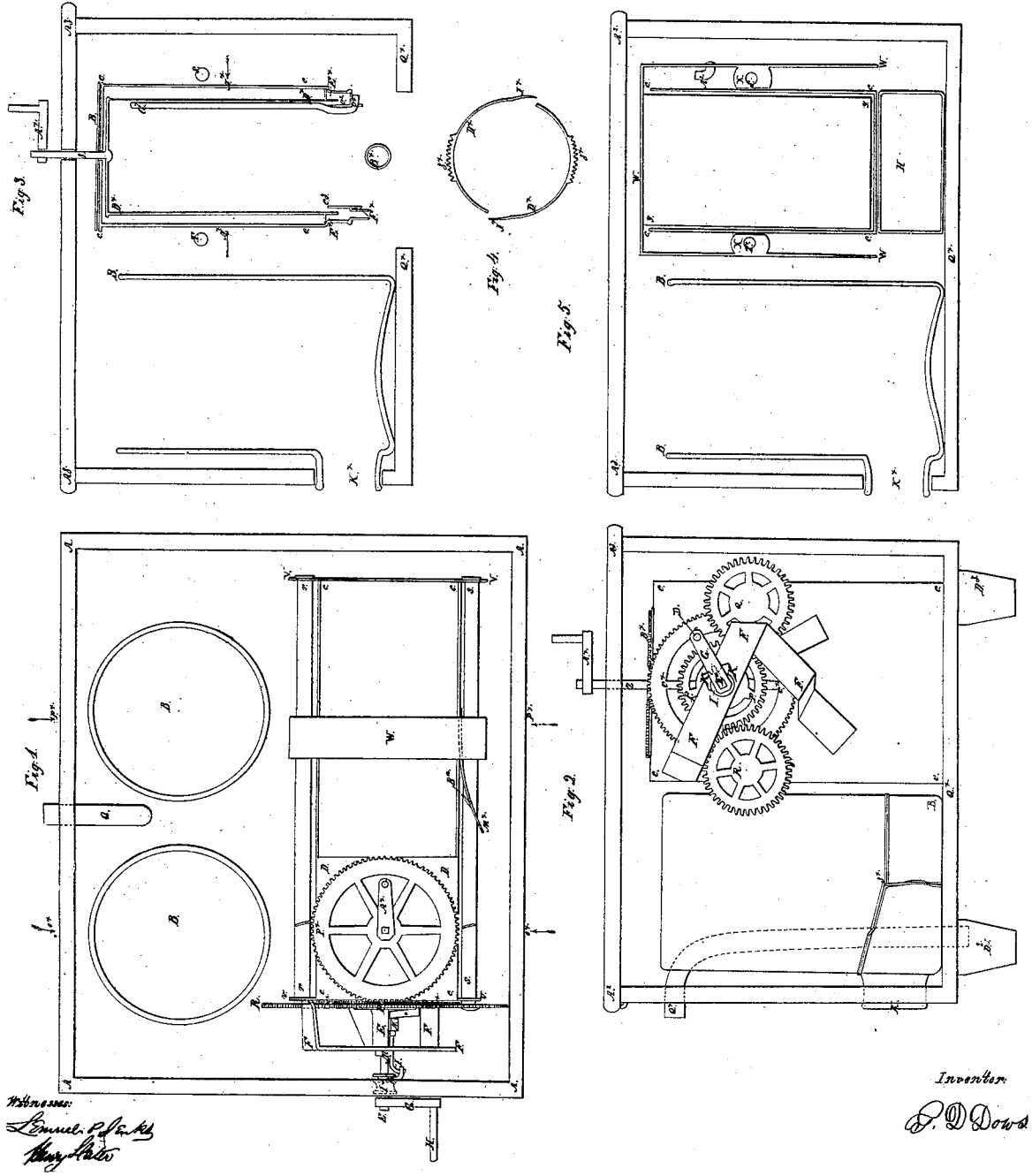

GUSTAVUS D. DOWS, OF BOSTON, MASSACHUSETTS.

IMPROVED SODA APPARATUS COMBINED WITH AN ICE-CUTTER.

Specification forming part of Letters Patent No. 33,880, dated December 10, 1861.

*To all whom it may concern:*

Be it known that I, GUSTAVUS D. DOWS, of Boston, Suffolk county, Massachusetts, have invented a new and Improved Soda Apparatus and Ice-Cutter; and I do hereby declare that the following is a full and exact description thereof, reference being had to the accompanying drawings, and to the letters of reference marked thereon.

The nature of my invention consists in an apparatus whereby I effect the cooling of soda, sirups, and cream and facilitate the keeping and admixture of them.

In the drawings annexed, Figure 1 is a top view of my apparatus, the cover being taken off. Fig. 2 is a side view with the side of the outer part removed. Fig. 3 is a perpendicular section of Fig. 1 at the line of the arrows $O^x\ O^x$. Fig. 4 is a horizontal section of $D^x\ D^x$, Fig. 3, at the line of the arrows $N^x\ N^x$. Fig. 5 is a perpendicular section of Fig. 1 at the line of the arrows $P^x\ P^x$.

A A A A, Fig. 1, show the four sides of a box, of wood, marble, or other substance, the bottom of which box is seen in Figs. 2, 3, and 5, marked $Q^x$.

C C C C, Figs. 1, 2, 3, and 5, show an ice box or trough, preferably of metal, open at the top, (see Fig. 1,) except at the left-hand end, where it is covered by the cover D D, and through the cover D D passes a perpendicular shaft Z, Fig. 1. To this is attached above the box-cover a removable crank $A^x$ with a handle, Figs. 1, 2, and 3. Between the crank and the cover is attached to this shaft Z a cog-wheel $B^x$, Fig. 1, gearing into the cog-wheel $C^x\ C^x$, turning loosely on its shaft, Fig. 2, on the side of the ice-box C C C C. The shaft of cog-wheel $C^x\ C^x$ bears also a cog-wheel P P, Fig. 2, firmly fixed upon it, which gears into two other wheels—one on each side—marked R and Q, Fig. 2, which wheels are attached to the ends, respectively, of horizontal screw-shafts T and S, Fig. 1, which are borne by projections U U V V from the sides of the ice-box, at each end of it. These shafts T and S bear nuts X X, Fig. 5, which nuts are firmly fixed to the inner sides, respectively, of the perpendicular parts of the band or strap W, Fig. 1, and W W W, Fig. 5. From the under surface of the band W depends a plate or sheet of metal or other substance Y, Fig. 5, called the "follower," which reaches nearly to the bottom of the ice-box C C C C. (Seen in perpendicular section in Fig. 5.) The shafts E E, Fig. 1, and F, Fig. 2, supported by the side of the box U U, Fig. 1, and by the brace F F F, Figs. 1 and 2, passes outside of the box A A A A, and has attached to it there a removable crank G, with its handle H.

At I, Figs. 1 and 2, is seen a nut movable back and forward at option on the shaft E, which at that point has a screw turned upon it. On this nut is seen at J, Fig. 1, a groove passing round the nut, and in this groove slides a clutch K, connected with a bolt $L^0$, which bolt slides back and forward through the hasp N, which hasp is fixed firmly to the side of the shaft E.

B B, Figs. 1, 2, 3, and 5, are two jars, preferably of glass, having each an eduction-aperture, as seen at $K^x$, Figs. 2, 3, and 5. These jars are fixed to the bottom of the box A A A A by wires. (Seen in view at $I^x$, Fig. 2.)

At Fig. 3 is seen a cylinder $D^x\ D^x$, armed with two vertical cutters $J^x\ J^x$, Fig. 4, and with two horizontally-placed saws $I^x\ I^x$, Fig. 4. This cutter and saw-cylinder is held in position at the top by the shaft Z, Fig. 3, and the top of the ice-chest C C, Fig. 3, and at the lower end by a flange $E^x\ E^x$, Fig. 3, which is fastened firmly round it and rests on the bottom of the ice-chest C C C C, Fig. 3, which at that place has a perforation about the size of the cutter and saw cylinder.

At $C^z\ C^z$, Fig. 3, is seen a ring forming the inner side of a circular trough, which is fastened firmly around the aperture in the bottom of the ice-chest, and the bottom of the cutter and saw-cylinder $D^x\ D^x$ passes down into this trough, but does not reach the bottom of it, and a small space is left all round between the cylinder and the inner sides of $C^z\ C^z$.

At $F^x$, Fig. 3, is seen the eduction-aperture of the circular trough by which the water is conveyed away, which runs down from the inner side of the cutting-cylinder, and also the waste water which leaks under the flange E from the ice-box—that portion which does not pass through the spaces in the cylinder $D^x\ D^x$, made for the passage of the cut ice.

$G^x\ G^x$, Fig. 3, is a wire going inside up the cylinder $D^x\ D^x$, close by the side of it and reaching nearly to the top. Beneath the cylinder is seen in section at $H^x$, Fig. 3, the circular eduction-aperture of the vessel or box, of metal, preferably. (Seen in section at Fig. 5, and also marked $H^x$.) Beneath the cylinder $D^x D^x$, Fig. 3, is a perforation of nearly the same diameter as the cylinder in the bottom $Q^x Q^x$ of the box A A A A, Fig. 1.

$A^z A^z$, Figs. 2, 3, and 5, show the cover of the box A A A A. $D^z D^z$, Fig. 2, are side views of the supports to the said box, and there is one at each corner.

$M^x$, Fig. 1, is a spring fastened to the side of the ice-box C C C C and curving outward in the direction of the crank G. On its lower edge is fixed a piece of metal $B^r$, Fig. 1, in such manner as that as seen from above it appears like the barb of a hook, and fixed on the inside of the band W W W, Fig. 5, is a catch or obstruction $A^a$, placed at such a height that, impinging at $B^q$, Fig. 1, upon the spring, the passage of the band W W W toward the crank G shall compress the spring toward the side of the box and release the same after passing it, when, springing back, the point $M^x$ hits upon the band W W W at the side and by the noise gives warning that the band W W W has passed as near the cutting-cylinder $D^x D^x$ as it should go.

$Q^x$, Figs. 1 and 2, is a pipe passing through the side and bottom of the outer box through which the soda is transmitted.

The operation of my apparatus is this: By the rotation of the crank G, I push the band W W W and the plate or follower Y Y, Fig. 5, as far back as they will go, and then place a lump of ice in the box C C C C between the plate or follower Y Y and the cutting-cylinder. When cutting the ice, I screw the nut I, Fig. 1, onto its shaft E as far as it will go, and then press the bolt L O through the open space of the cog-wheel P (see Fig. 2) into an open space in the cog-wheel $C^x$, which, revolving loosely on its shaft, is not rotated by the rotation of the crank G and the shaft E except when the bolt L O is pushed forward. The cog-wheel $C^x$ is always in gear with the cog-wheel $B^x$ above. (See Fig. 1.) I then rotate the shaft Z, Fig. 1, by its crank, thus rotating the cylinder $D^x D^x$, (see Fig. 3,) with its cutters $J^x J^x$ and saws $I^x I^x$. (See Fig. 4.) At the same time, by the rotation of the shafts S and T, Fig. 1, the plate or follower Y Y (see Fig. 5) is advanced toward the cutters, thus feeding the ice up as fast as it is cut. The saws $I^x I^x$, Fig. 4, by sawing assist the reduction of the ice and diminish the strain upon the cutters. I cut the ice by the rotation of either crank indifferently. When the ice is exhausted, the spring $M^x$, Fig. 1, by its snapping gives warning of the same. By screwing the nut I on the shaft E, Fig. 1, I disconnect the cog-wheels P, R, and Q, when by the rotation of the crank $A^x$, Fig. 1, I cut the ice without advancing the plate or follower Y Y. I also make this disconnection when I wish by rotation of the shafts S and T to place the plate or follower Y Y, Fig. 5, back at the farther end of the ice-box without rotating the cutting-cylinder. The ice being cut passes into the upright cutting-cylinder $D^x D^x$, Fig. 3, and if any adheres to the inside it is scraped therefrom by the scraping-wire $G^x$, Fig. 3, and any adherent moisture runs down into the trough at $C^z C^z$, Fig. 3, whence by the pipe $F^x$ it is discharged below without falling into the tumbler or vessel for the beverage. From the aperture at $H^x$, Fig. 3, I obtain (by the withdrawal of a cork or by means of any convenient faucet) the cream or milk without removing the tumbler from the place at which it receives the ice, and then passing the tumbler to the front at $K^x$, Fig. 5, it receives the sirup and subsequently the soda. I sometimes dispense with the saws on the cutting-cylinder, also the scraping-wire, also the alarm-spring, and sometimes I have six or twelve or more sirup-vessels, and upon the eduction-apertures of these I sometimes place faucets. I sometimes run my soda-pipe through the box and sometimes attach it to the outside of it. Sometimes I connect a bell with the spring $M^x$. Sometimes I have but one screw-shaft and nut to move my follower Y Y. Sometimes I connect a spring-valve or other valve to the eduction-aperture of the cream-can. Sometimes I use the ice-box and cutter without the other parts of the apparatus. Sometimes I withdraw the bolt L O in other modes.

I do not claim an arrangement in which the sirup-containing vessels are placed in immediate juxtaposition with the ice-vessel; nor do I claim an arrangement of sirup-cans and ice-chamber and soda-draft pipe where the soda-pipe passes through the broken ice which cools it; but

What I claim is—

1. The arrangement for cutting ice of one or more cutters placed in a vertical cylinder, where the same are so arranged as to permit the passage downward of the ice, and are in combination with substantially the screw-shafts T and S, nuts X X, and follower Y Y.

2. The arrangement of the ice-cutter, substantially as and for the purpose above described, where the same is in combination with the enveloping-chest A A A A, sirup-vessels B B, and cream-chest H.

3. The combination of the cream-chest $H^x$, the enveloping-chest A A A A, the ice-chest C C C C, and sirup-vessels B B, all arranged substantially as and for the purpose above described.

G. D. DOWS.

In presence of—
LEMUEL P. JENKS,
AARON KINGSBURY.